United States Patent
Parra Pastor et al.

(10) Patent No.: US 8,492,458 B2
(45) Date of Patent: Jul. 23, 2013

(54) SOLVENT BORNE POLYURETHANE COMPOSITION

(75) Inventors: Ester Parra Pastor, Parets del Valles (ES); Joan Tiana Ruiz, Parets del Valles (ES); Urs Jürgen Frieden Hugel, Parets del Valles (ES)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 13/532,248

(22) Filed: Jun. 25, 2012

(65) Prior Publication Data

US 2012/0263925 A1    Oct. 18, 2012

Related U.S. Application Data

(63) Continuation of application No. 11/994,662, filed as application No. PCT/EP2006/006894 on Jul. 14, 2006, now abandoned.

(30) Foreign Application Priority Data

Jul. 14, 2005    (EP) .................................... 05381037

(51) Int. Cl.
| | |
|---|---|
| *B05D 5/00* | (2006.01) |
| *B32B 27/00* | (2006.01) |
| *B32B 27/40* | (2006.01) |
| *B41F 7/00* | (2006.01) |
| *B41L 7/00* | (2006.01) |
| *B41L 9/00* | (2006.01) |
| *B41L 11/00* | (2006.01) |
| *C08G 18/08* | (2006.01) |
| *C08G 18/28* | (2006.01) |
| *C08L 75/00* | (2006.01) |
| *C09D 5/00* | (2006.01) |
| *C09D 11/00* | (2006.01) |

(52) U.S. Cl.
USPC ........ 523/160; 101/130; 427/256; 428/423.1; 523/161; 524/589; 524/590

(58) Field of Classification Search
USPC ........ 523/160, 161; 524/589, 590; 428/423.1; 427/256; 101/130
See application file for complete search history.

(56) References Cited

U.S. PATENT DOCUMENTS

| | | | |
|---|---|---|---|
| 4,791,168 | A | 12/1988 | Salatin et al. |
| 5,214,120 | A | 5/1993 | Watanabe et al. |
| 5,447,832 | A | 9/1995 | Wang et al. |
| 6,433,073 | B1 | 8/2002 | Kantner et al. |
| 2008/0226881 | A1 | 9/2008 | Parra Pastor et al. |

FOREIGN PATENT DOCUMENTS

| | | |
|---|---|---|
| EP | 1 229 090 | 8/2002 |
| EP | 1 533 329 | 5/2005 |
| JP | 08-176253 | 7/1996 |
| WO | WO 00/15728 | 3/2000 |
| WO | WO 01/14442 | 3/2001 |

OTHER PUBLICATIONS

International Search Report for PCT/EP2006/006894 mailed Nov. 23, 2006.
U.S. Appl. No. 12/759,459, filed Apr. 13, 2010.
Sperling, "Introduction to Physical Polymer Science," $3^{rd}$ ed, Lehigh University, PA, Wiley-Interscience, 2001.
Bata et al, "Polymer Characterization by Gel Permeation Chromatography," J. Polymer Sci., Part C, No. 30, pp. 157-162, 1970.
*Polymer Characterization by Gel Permeation Chromatography*, J. Polymer Sci., Part C No. 30, pp. 157-162 (1970).
*Introduction to Physical Polymer Science*, L.H. Sperling, Wiley-Interscience, pp. 45-46, 138-141, 578-579 (2001).

*Primary Examiner* — Patrick Niland
(74) *Attorney, Agent, or Firm* — Nixon & Vanderhye P.C.

(57) ABSTRACT

A solvent borne polyurethane composition with a polymodal molecular weight distribution comprising: i) 10 to 90 wt % of at least a polyurethane A with a Mw in the range of from 4,000 up to 25,000 g/mol, ii) 90 to 10 wt % of at least a polyurethane B with a Mw in the range of from 25,000 to 100,000 g/mol and iii) a liquid medium.

18 Claims, No Drawings

SOLVENT BORNE POLYURETHANE COMPOSITION

This application is a continuation of U.S. application Ser. No. 11/994,662, filed Jun. 4, 2008 (now abandoned), which is the national phase application of international application PCT/EP2006/006894, filed Jul. 14, 2006 which designated the U.S. and claims benefit of EP 05381037.0, dated Jul. 14, 2005, the entire contents of each of which are hereby incorporated by reference.

The invention relates to a solvent borne polyurethane composition, processes for preparing the solvent borne polyurethane composition and an ink, in particular a printing ink comprising the solvent borne polyurethane composition for use in a laminate.

Laminates are multi-layered composites where each layer consists of the same or different materials. In the field of flexible packaging, laminates usually comprise plastic and/or metallised films. Flexible packaging is used for example in the food industry and has many requirements such as for example eliminating or limiting the transfer of moisture, oxygen, oils and flavours; flexible packaging used for microwave cooking needs to protect the contents during storage but also needs to have good heat resistance; flexible packaging used for beverages needs to have good cold resistance and handling resistance; flexible packaging used in other applications may also need to be resistant to the transfer to perfumes, resistant to surfactants, resistant to oil/water mixtures, and additionally the flexible packaging should be easy to open when required.

Generally laminates are produced by joining two or more layers using adhesives or by carrying out adhesive-free extrusion coating. Additionally it is often desirable to apply an image to one or more of the layers during the lamination process.

For example, if using an adhesive laminating method an image may be printed onto a plastic film substrate, after which an adhesive is applied to the inked substrate, followed by applying a second film to the adhesive (the adhesive could also be applied to the second film). If using an extrusion coating/laminating method an image may be printed onto a plastic film substrate, optionally followed by the application of a primer and then a molten resin is extruded onto the inked substrate to form a second layer followed by the formation of a bond between the two substrates. It is therefore desirable that laminating inks possess excellent adhesion to the printing substrate as well as to the film adhesive and/or film to be laminated.

Laminated films, when used to make packaging, often undergo heat sealing and when used as food packaging must be able to undergo a boiling or retorting treatment for cooking or sterilising the contents. It is therefore also desirable that delamination does not occur during such processes.

The properties of a laminate therefore depend on the type of films used, the laminating process, the type of adhesive and the ink properties and in particular the properties of any resins used as binders in the ink.

The types of films that are used in flexible packaging laminates include, among others polyester, cellophane, polypropylene, polyethylene, aluminium foils, nylon and paper. Such films may also have been functionalised through a range of chemical and physical treatments.

A range of binders have been used in laminating inks such as modified PVC (polyvinyl chloride), polyvinyl butyral, polyamides, polyesters, nitrocellulose and polyurethanes. However it has been found that some binders are incompatible, difficult to clean up from ink printing equipment and many only adhere to certain substrates and even if the binders do adhere, they may be poor in their resistance to boiling or retorting treatments and generally do not achieve desirable bond strength. In addition there is an increase in demand for high line speed printing, especially at line speeds greater than 200 m/min or even greater than 300 m/min. However, at such line speeds printability problems such as cob-webbing may occur for flexo printing and scumming may appear for gravure printing processes. One cause of such problems is the limited resolubility, which is sometimes also described as the redispersibility of the binders used in the inks in the typical solvents used in these applications. Resolubilty or redispersibility is a property, well known to the printing industry, whereby dry or drying polymer obtained from a polymer composition is redispersible or redissolvable in that same composition when the latter is applied thereto.

Although the use of solvents such as ketones or solvents with a slower evaporation rate may be used to solve some of the problems, these solvents may have other inherent issues such as safety and environmental issues as well as that they may be slow to dry which can result in the solvent migrating into the packed material. Therefore the use of solvents with a faster evaporation rate is useful, although if they are too fast then printability failures may also occur.

There are also concerns with undesirable chlorine containing compounds (notably hydrochloric acid and phosgene) being given of during the incineration of packaging printed with polyvinyl chloride based inks and polyvinyl butyral based inks.

A method for overcoming such problems is to use a combination of binders where binders may be chosen to suit particular films and adhesives. However a disadvantage with such an approach is that a large number of binders need to be prepared and stored for all the different types of inks that may be applied to the laminate films. Additionally if the various inks are not compatible with each other then extensive cleaning of the printing equipment would be required for each change over.

Traditional low molecular weight polyurethanes may give good printability but only have a limited application for laminates and usually require blending with at least a second harder binder to achieve a good balance in properties.

Elastomeric higher molecular weight polyurethanes are widely used in laminating inks and can give a good balance in properties however they have reduced printability especially in high speed printing processes.

EP 604890 B1 discloses a printing ink composition for a laminate comprising a polyurethane resin where the polyurethane is prepared with a low and a high molecular weight polyol. WO 02/38643 discloses solvent based poly(urethane/urea) resins suitable for laminating printing inks where the polyurethane prepolymer is derived from a blend of a polymeric diol and a diol. WO 01/14442 discloses a polyurethane resin obtained by preparing an isocyanate-terminated prepolymer which is then reacted with a diamine which suitable for formulating printing ink compositions. EP 1229090 A1 discloses a polyurethane resin, soluble in organic solvents, where the polyurethane is prepared with at least three polyols within different molecular weight ranges and where the polyurethane resin can be used in a printing ink for making laminates.

A disadvantage of such polyurethanes is that they often still require combining with other binders to get a good balance of properties such as for example adhesion, block resistance, flexibility and heat resistance. Furthermore the prior art does not describe a polyurethane binder that provides a good bond strength whilst maintaining printability at high line speeds.

Surprisingly we have found that it is possible to prepare polyurethane binders that overcome many of the disadvantages of the prior art systems with a polyurethane system which is suitable for inter alia flexo and gravure printing processes on a broad range of substrates used in flexible packaging film laminates and which are suitable for extrusion lamination.

According to the present invention there is provided a solvent borne polyurethane composition comprising:

I) 10 to 90 wt % of at least a polyurethane A with a weight average molecular weight (Mw) in the range of from 4,000 up to 25,000 g/mol;

II) 90 to 10 wt % of at least a polyurethane B with a weight average molecular weight (Mw) in the range of from 25,000 to 100,000 g/mol;

where i)+ii) add up to 100%; and

III) a liquid medium.

Preferably the composition comprises 10 to 85 wt %, more preferably 10 to 60 wt %, most preferably 10 to 50 wt % and especially 10 to 40 wt % of at least a polyurethane A.

Preferably the composition comprises 90 to 15 wt %, more preferably 90 to 40 wt %, most preferably 90 to 50 wt % and especially 90 to 60 wt % of at least a polyurethane B.

The Mw is the weight average molecular weight usually determined using Gel Permeation Chromatography (GPC) with polystyrene as a standard and tetrahydrofuran as an eluent.

Preferably polyurethane A has a Mw in the range of from 4,000 to 25,000 g/mol, more preferably 5,000 to 23,000 g/mol and even more preferably 5,500 to 22,000 g/mol.

Preferably polyurethane B has a Mw in the range of from 25,000 to 100,000 g/mol, more preferably 30,000 to 80,000 g/mol, most preferably 31,000 to 70,000 g/mol and especially 32,000 to 60,000 g/mol.

Preferably 15 to 85 wt % of the polyurethanes in the composition of the invention have a Mw at least 10,000 g/mol greater than the Mw of the remaining 85 to 15 wt % of the polyurethanes.

Preferably the composition of the invention comprises 90 to 10 wt % of polyurethane A and 10 to 90 wt % of polyurethane B with the proviso that 35 to 70 wt % of polyurethanes in the composition have a Mw of at least 5,000 g/mol and more preferably 10,000 g/mol greater than the Mw of 20 to 50 wt % of the polyurethanes in the composition.

The Mp is the molecular weight with the highest signal (i.e. the apex of the peak) in a chromatogram resulting from the measuring of the molecular weight of the invention composition using Gel Permeation Chromatography (GPC) with polystyrene as a standard and tetrahydrofuran as an eluent. The Mp is also known as the peak Mw. Mp values are discussed in Modern Size Exclusion Liquid Chromatography, W. W. Yau, J. K. Kirkland and D. D. Bly, John Wiley & Sons, USA, 1997.

Preferably the Mp of the polyurethanes in the composition of the invention is in the range of from 6,000 to 60,000 g/mol, more preferably 20,000 to 60,000 g/mol, most preferably 25,000 to 60,000 g/mol, and especially 30,000 to 60,000 g/mol.

Preferably the composition of the invention comprises at least 10 to 90 wt %, more preferably 50 to 90 wt % and most preferably 75 to 90 wt % of a polyurethane having an Mp in the range of from 6,000 to 60,000 g/mol, more preferably 25,000 to 55,000 g/mol and most preferably 32,000 to 50,000 g/mol.

Preferably the polyurethanes in the composition have a polymodal molecular weight distribution.

The polydispersity index (PDi) is defined as the weight average molecular weight (Mw) divided by the number average molecular weight (Mn). The PDi is calculated on the total molecular weight of the polyurethanes A and B of the invention composition.

Preferably the PDi of the polyurethanes in the composition of the invention is in the range of from 1.3 to 10.0, more preferably 2.8 to 6.0, most preferably 3.0 to 6.0 and especially 3.0 to 5.0.

In a further embodiment of the present invention the composition of the invention comprises polyurethanes having an Mp in the range of from 6,000 to 60,000 g/mol and a PDi in the range of from 2.8 to 6.

Preferably polyurethane A is non-film forming. Preferably polyurethane B is film-forming. Preferably the composition of the invention is film-forming. By film-forming is meant that on removal of most or all of the liquid medium from the polyurethane composition a cohesive film is formed. Furthermore it has a minimum level of strength and is dry to touch i.e. it can be slightly tacky but the material will not transfer to when it is touched. A non-film-forming polyurethane will even in the absence of any liquid medium remain very tacky and like a paste.

Preferably the solvent based polyurethane composition comprises 80 to 25 wt %, more preferably 70 to 30 wt %, most preferably 60 to 35% and especially 50 to 40 wt % of III) the liquid medium.

By solvent based composition is meant that the liquid medium substantially comprises solvents. Preferably III) the liquid medium comprises $\leqq 20$ wt % of water, more preferably $\leqq 6$ wt % and most preferably $\leqq 1$ wt % of water. If the liquid medium comprises any water, then preferably the water is added after the preparation of the polyurethanes is complete. Preferably the liquid medium comprises $\geqq 75$ wt %, more preferably $\geqq 90$ wt %, most preferably $\geqq 98$ wt % and especially 100 wt % of fast evaporating solvents. Fast evaporating solvents may be defined as solvents having a molecular weight $\leqq 125$ g/mol and more preferably $\leqq 105$ g/mol. More preferably fast evaporating solvents are defined as solvents having an evaporation rate of at $\geqq 1.0$, more preferably $\geqq 1.4$ and preferably $\geqq 1.6$. Values for evaporation rates were published by Texaco Chemical Company in a bulletin Solvent Data: Solvent Properties (1990). (The values given are relative to the evaporation rate (ER) of butyl acetate which is defined as 1.00). Determination of evaporation rates of solvents that are not listed in the Texaco bulletin is as described in ASTM D3539. Fast evaporating solvents are particularly useful where fast drying times are required, especially when printing onto hydrophobic and non-absorbent substrates, for example plastics, metal and glass.

Examples of such solvents include alcohols (such as ethanol, isopropanol, n-butanol, n-propanol), esters (such as ethyl acetate, propyl acetate), aromatic solvents (such as toluene), ketone solvents (such as acetone, methyl ethyl ketone, methyl isobutyl ketone) cyclohexanone, diacetone alcohol; aliphatic hydrocarbons; chlorinated hydrocarbons (such as $CH_2Cl_2$); ethers (such as diethyl ether, tetrahydrofuran) and mixtures thereof. Most preferably the liquid medium comprises a solvent selected from the group comprising ethanol, isopropanol, ethylacetate and or a mixture thereof. The liquid medium may also comprise other organic solvents such as ethoxy propanol and propylene glycol n-propyl ether.

The polyurethane composition of the invention also preferably has a viscosity $\leqq 18,000$ mPa·s, more preferably $\leqq 12,000$ mPa·s, most preferably $\leqq 10,000$ mPa·s and especially $\leqq 5,000$ mPa·s at any solids content in the range of from 20 to 75 wt %, more preferably 35 to 75 wt %, most preferably 45 to 75 wt % and especially 50 to 75 wt % in a solvent comprising ≧70 wt %, more preferably ≧90 wt % and most preferably 100 wt % of at least one solvent having an evaporation rate ≧1. All viscosities are measured according to ISO 2555-1989 at 25° C. Preferred solvents used to measure the viscosity of the polyurethane in, include ethanol, isopropanol, n-propanol, ethyl acetate, propyl acetate and or mixtures thereof.

The polyurethane A and polyurethane B of the invention composition are preferably obtained by reacting components comprising (i) at least one polyisocyanate; (ii) optionally at least one isocyanate-reactive polyol with a weight-average molecular weight in the range of from 50 to 200 g/mol; (iii) at least one isocyanate-reactive polyol with a weight-average molecular weight in the range of from 201 to 20,000 g/mol; (iv) a chain-extending and/or chain-terminating component not comprised by (i), (ii), or (iii); and optionally (v) an isocyanate-reactive polyol not comprised by (ii), (iii) or (iv); optionally in the presence of a liquid medium.

The polyisocyanate component (i) may be an aliphatic polyisocyanate, an aromatic isocyanate or mixtures thereof.

The term aromatic polyisocyanate (for the sake of clarity) is intended to mean compounds in which all the isocyanate groups are directly bonded to an aromatic group, irrespective of whether aliphatic groups are also present. Examples of suitable aromatic polyisocyanates include but are not limited to p-xylylene diisocyanate, 1,4-phenylene diisocyanate, 2,4-toluene diisocyanate, 2,6-toluene diisocyanate, 4,4'-methylene bis(phenyl isocyanate), polymethylene polyphenyl polyisocyanates, 2,4'-methylene bis(phenyl isocyanate) and 1,5-naphthylene diisocyanate. Preferred aromatic isocyanates include 2,4'-methylene bis(phenyl isocyanate) and 4,4'-methylene bis(phenyl isocyanate). Aromatic polyisocyanates provide chemical resistance and toughness but may yellow on exposure to UV light.

The term aliphatic polyisocyanate (for the sake of clarity) is intended to mean compounds in which all the isocyanate groups are directly bonded to aliphatic or cycloaliphatic groups, irrespective of whether aromatic groups are also present.

Examples include but are not limited to ethylene diisocyanate, para-tetra methylxylene diisocyanate (p-TMXDI), meta-tetra methylxylene diisocyanate (m-TMXDI), 1,6-hexamethylene diisocyanate, isophorone diisocyanate (IPDI), cyclohexane-1,4-diisocyanate and 4,4'-dicyclohexylmethane diisocyanate. Aliphatic polyisocyanates improve hydrolytic stability, resist UV degradation and do not yellow. Preferred aliphatic isocyanates include isophorone diisocyanate, 4,4'-dicyclohexylmethane diisocyanate and 1,6-hexamethylene diisocyanate.

Preferably at least 70 wt %, more preferably at least 85 wt % and most preferably at least 95 wt % of the polyisocyanate in component (i) has two isocyanate groups.

Aromatic or aliphatic polyisocyanates which have been modified by the introduction of, for example, urethane, allophanate, urea, biuret, uretonimine and urethdione or isocyanurate residues may be used for component (i).

Preferably polyurethane A comprises 2 to 50 wt %, more preferably 5 to 45 wt % and most preferably 8 to 45 wt % of component (i).

Preferably polyurethane B comprises 4 to 50 wt %, more preferably 10 to 35 wt % and most preferably 12 to 20 wt % of component (i).

The isocyanate-reactive components (ii) to (iv) will normally consist of a polyol component bearing isocyanate-reactive groups which may also bear other reactive groups. Polyol components also include compounds with one or more isocyanate-reactive groups such as —OH, —CHR$^1$—COOH where R$^1$ can be H, alkyl (more preferably C$_1$ to C$_8$ alkyl); —SH, —NH— and —NH$_2$.

Examples of component (ii) include but are not limited to 1,4-cyclohexyldimethanol, ethylene glycol, propylene glycol, diethylene glycol, neopentyl glycol, 1,4-butanediol, 1,6-hexanediol, furan dimethanol, cyclohexane dimethanol, glycerol, trimethylolpropan, dimethylol propanoic acid (DMPA) and dimethylol butanoic acid (DMBA).

Preferably component (ii) has an average of 1.8 to 3 isocyanate-reactive groups and more preferably component (ii) has an average of 1.8 to 2.5 isocyanate-reactive groups. For example component (ii) may comprise a mixture of a triol and a diol which together have an average of 1.8 to 2.5 isocyanate-reactive groups.

Preferably the weight average molecular weight of component (ii) is in the range of from 62 to 200 g/mol and more preferably 84 to 200 g/mol.

Preferably polyurethane A comprises 0 to 20 wt %, more preferably 0 to 10 wt % and most preferably 0 to 5 wt % of component (ii).

Preferably polyurethane B comprises 0 to 20 wt %, more preferably 0 to 10 wt % and most preferably 0 to 5 wt % of component (ii).

Examples of component (iii) and optional component (v) include but are not limited to polyols such as polypropylene glycols, poly(propylene oxide/ethylene oxide) copolymers, polytetrahydrofuran, polybutadiene, hydrogenated polybutadiene, polysiloxane, polyamide polyesters, isocyanate-reactive polyoxyethylene compounds, polyester, polyether, polyether ester, polycaprolactone, polythioether, polycarbonate, polyethercarbonate, polyacetal and polyolefin polyols. Generally polyester polyols provide good weathering, good adhesion, improved chemical resistance and toughness; polyether polyols provide good flexibility, elasticity and storage stability; polycaprolactone polyols provide improved weathering and better heat resistance than polyether polyols and better water resistance than adipate polyester polyols.

Polyester amides may be obtained by the inclusion of amino-alcohols such as ethanolamine in polyesterification mixtures. Polyesters which incorporate carboxy groups may be used, for example polyesters where DMPA and/or DMBA are used during the synthesis.

Polyether polyols which may be used include products obtained by the polymerisation of a cyclic oxide, for example ethylene oxide, propylene oxide or tetrahydrofuran or by the addition of one or more such oxides to polyfunctional initiators, for example water, methylene glycol, ethylene glycol, propylene glycol, diethylene glycol, cyclohexane dimethanol, glycerol, trimethylopropane, pentaerythritol or Bisphenol A. Especially useful polyether polyols include polyoxypropylene diols and triols, poly (oxyethylene-oxypropylene) diols and triols obtained by the simultaneous or sequential addition of ethylene and propylene oxides to appropriate initiators and polytetramethylene ether glycols obtained by the polymerisation of tetrahydrofuran. Particularly preferred are polypropylene glycols.

Components (iii) and (v) may also include crosslinking groups. Crosslinking groups are well known in the art and include groups which crosslink at ambient temperature (20±3° C.) or at elevated temperatures by a number of mechanisms including but not limited to Schiff base crosslinking (for example the reaction of carbonyl functional groups with carbonyl reactive amine and/or hydrazine functional groups); silane crosslinking (for example the reaction of alkoxy silane groups in the presence of water) and epoxy groups crosslinking with epoxy-reactive functional groups or isocyanate curing, where hydroxy or amine (primary or secondary) functional polyurethanes are combined with polyisocyanates. Usually the polyisocyanates are added shortly before application. Alternatively, blocked polyisocyanates are used which deblock at elevated temperature after application. Isocyanate crosslinking is most preferred, when crosslinking is applied during the application process.

Preferably the weight average molecular weight of component (iii) is in the range of from 350 to 11,000 g/mol, more preferably 350 to 6,000 g/mol and especially 350 to 5,000 g/mol.

Preferably polyurethane A comprises 0 to 95 wt %, more preferably 30 to 95 wt % and most preferably 40 to 92 wt % of component (iii).

Preferably polyurethane B comprises 0 to 95 wt %, more preferably 60 to 90 wt % and most preferably 70 to 80 wt % of component (iii)

Preferably polyurethane A comprises 0 to 95 wt %, more preferably 0 to 6 wt %, most preferably 0 to 3 wt % and especially 0 wt % of component (v).

Preferably polyurethane B comprises most preferably 0 to 95 wt %, more preferably 0 to 6 wt %, most preferably 0 to 3 wt % and especially 0 wt % of component (v).

Component (iv) comprises a chain-extending and/or chain-terminating component.

Examples of chain-terminating compounds include mono-alcohols, amino-alcohols, primary or secondary amines and mono-functional hydrazines as are well known in the art. Di- or poly-functional isocyanante-reactive compounds may be used as a chain-terminating compound If only one isocyanante-reactive group reacts under the given conditions. Examples of such difunctional compounds include ethanol amine and diethanolamine. The chain-terminating compound may also be a mono-functional isocyanate.

Examples of chain-extending compounds include amino-alcohols, primary or secondary diamines or polyamines such as ethylene diamine, propylene diamine and cyclic amines such as isophorone diamine and 4,4'-dicyclohexylmethane diamine; hydrazine and substituted hydrazines such as, for example, dimethyl hydrazine, 1,6-hexamethylene-bis-hydrazine, carbodihydrazine, hydrazides of dicarboxylic acids and sulphonic acids such as adipic acid dihydrazide, oxalic acid dihydrazide, isophthalic acid dihydrazide, hydrazides made by reacting lactones with hydrazine, bis-semi-carbazide, and bis-hydrazide carbonic esters of glycols; azines such as acetone azine, and or mixtures thereof. Another suitable class of chain-extending compounds are the so-called "Jeffamine" compounds with a functionality of 2 or 3 (available from Huntsman). These are PPO or PEO-based di or triamines, e.g. "Jeffamine" T403 and "Jeffamine" D-400. In a special embodiment where the prepolymer has isocyanate-reactive functional groups (such as hydroxyl groups) a chain-extending compound may also be a difunctional isocyanate.

Preferably polyurethane A comprises 0 to 40 wt %, more preferably 0 to 20 wt %, most preferably 0 to 10 wt % and especially 0 to 9 wt % of component (iv).

Preferably polyurethane B comprises 0 to 40 wt %, more preferably 0.5 to 25 wt %, most preferably 1 to 10 wt % and especially 3 to 8 wt % of component (iv).

The polyurethane A of the invention composition is most preferably obtained by reacting components comprising:
 (i) 8 to 45 wt % of at least one polyisocyanate;
 (ii) 0 to 5 wt % of at least one isocyanate-reactive polyol with a weight-average molecular weight in the range of from 50 to 200 g/mol;
 (iii) 40 to 92 wt % of at least one isocyanate-reactive polyol with a weight-average molecular weight in the range of from 201 to 20,000 g/mol;
 (iv) 0 to 9 wt % of a chain-extending and/or chain-terminating component not comprised by (i), (ii), or (iii);
 (v) 0 to 3 wt % of an isocyanate-reactive polyol not comprised by (ii), (iii) or (iv);
where (i), (ii), (iii), (iv) and (v) add up to 100%;
optionally in the presence of a liquid medium.

The polyurethane B of the invention composition is most preferably obtained by reacting components comprising:
 (i) 12 to 20 wt % of at least one polyisocyanate;
 (ii) 0 to 5 wt % of at least one isocyanate-reactive polyol with a weight-average molecular weight in the range of from 84 to 200 g/mol;
 (iii) 70 to 89 wt % of at least one isocyanate-reactive polyol with a weight-average molecular weight in the range of from 350 to 5,000 g/mol;
 (iv) 3 to 8 wt % of a chain-extending and/or chain-terminating component not comprised by (i), (ii), or (iii);
 (v) 0 to 3 wt % of an isocyanate-reactive polyol not comprised by (ii), (iii) or (iv);
where (i), (ii), (iii), (iv) and (v) add up to 100%;
optionally in the presence of a liquid medium.

The polyurethanes A and B of the invention composition may each comprise one or more than one polyurethane. The invention composition may be prepared by blending two or more polyurethanes and or by preparing one polyurethane in the presence of another (which is also known as an in situ preparation). Both routes may provide a composition comprising polyurethanes with a polymodal molecular weight distribution.

In an embodiment of the invention the solvent borne polyurethane composition comprising polyurethane A and polyurethane B may be obtained by blending polyurethane A and polyurethane B.

Alternatively the solvent borne polyurethane composition comprising polyurethane A and polyurethane B may be obtained by a number of in-situ processes. For example polyurethane A may be prepared in the presence of polyurethane B or polyurethane B may be prepared in the presence of polyurethane A.

The polyurethanes of the invention composition may be prepared conventionally by reacting the organic polyisocyanate (component (i)) with the isocyanate-reactive compounds (components (ii), (iii) and (v)) under substantially anhydrous conditions at a temperature between about 30° C. and about 130° C., more preferably about 45° C. to about 85° C. until reaction between the isocyanate groups and the isocyanate-reactive groups is substantially complete. Preferably the reactants are generally used in proportions corresponding to a ratio of isocyanate groups to isocyanate-reactive groups of from about 0.45:1 to about 2:1, more preferably from about 1.2:1 to about 2:1, most preferably from about 1.3:1 to 2.0:1 and especially 1.45:1 to 2:1.

If desired, catalysts such as dibutyltin dilaurate and stannous octoate, zirconium or titanium based catalysts may be used to assist the polyurethane formation. Optionally no catalyst is added. Preferably no tin based catalyst is added. The catalyst, if used, may be added immediately to a mixture of components (i) (ii), (iii) and (v) or the mixture of components (i) (ii), (iii) and (v) may be allowed to react for a period of time before the addition of a catalyst. The reaction between the components may be carried out in any order.

The reaction is usually carried out in the presence of an organic solvent to control the viscosity. Suitable organic solvents include but are not limited to acetone, tetrahydrofuran, ethyl acetate, methyl ethyl ketone, methyl isobutyl ketone and other solvents well known in the art.

If an isocyanate-terminated prepolymer is formed it may be reacted with a chain-extending and/or chain-terminating component (iv). Alternately a hydroxyl-terminated prepolymer may be formed which may also be reacted with a chain-extending and/or chain-terminating component or used directly with another polyurethane.

In an embodiment of the invention the solvent borne polyurethane composition comprising polyurethane A and polyurethane B is obtained by a process comprising the following steps:

1) preparing an isocyanate-terminated prepolymer;
2a) reacting the isocyanate groups of isocyanate-terminated prepolymer with 0.1 to 0.6 stoichiometric equivalents of at least one active-hydrogen containing chain-terminating compound;
2b) reacting the isocyanate groups of the isocyanate-terminated prepolymer obtained in step 2a) with 0.1 to 1.2 stoichiometric equivalents of at least one active-hydrogen containing chain-extending compound;
2c) optionally reacting the isocyanate groups obtained from step 2b) with 0 to 1.0 stoichiometric equivalents of at least one active-hydrogen chain-terminating compound.

Optionally steps 2a) and/or 2b) may be repeated.

A further isocyanate-terminated prepolymer may be prepared and then blended with the isocyanate-terminated prepolymer obtained in step 2b) or a further isocyanate-terminated prepolymer may be prepared in the presence of the prepolymer obtained in step 2b).

In a further embodiment of the invention the solvent borne polyurethane composition comprising polyurethane A and polyurethane B is obtained by a process comprising the following steps:

1) preparing an isocyanate-terminated prepolymer A;
2a) reacting the isocyanate groups of isocyanate-terminated prepolymer A with 0 to 0.95 stoichiometric equivalents of at least one active-hydrogen containing chain-terminating compound;
2b) reacting the isocyanate groups of isocyanate-terminated prepolymer A with 0 to 0.95 stoichiometric equivalents of at least one active-hydrogen containing chain-extending compound;
where steps 2a) and 2b) together are in the range of from 0.1 to 1.8 stoichiometric equivalents;
3) optionally introducing an isocyanate-terminated compound B;
4a) reacting the isocyanate groups of the isocyanate-terminated prepolymer obtained in steps 2a) and 2b) and isocyanate groups of the isocyanate-terminated compound B introduced in step 3) with 0 to 1.0 stoichiometric equivalents of at least one active-hydrogen containing chain-terminating compound;
4b) reacting the isocyanate groups of the isocyanate-terminated prepolymer obtained in steps 2a) and 2b) and the isocyanate groups of the isocyanate-terminated compound B introduced in step 3) with 0 to 1.2 stoichiometric equivalents of at least one active-hydrogen containing chain-extending compound;
where steps 4a) and 4b) together are in the range of from 0 to 1.2 stoichiometric equivalents;
where the process comprises at least one step with an active-hydrogen containing chain-extending compound and at least one step with an active-hydrogen containing chain-terminating compound;
where if 0 wt % of the isocyanate-terminated compound B is introduced then step 2a) comprises 0.1 to 0.95 stoichiometric equivalents of at least one active-hydrogen containing chain-terminating compound and at least a step 2a) is performed before a step 2b).

Preferably the isocyanate-terminated prepolymer A in step 1) has an isocyanate group content in the range of from 0.5 to 5.5 wt %, more preferably 0.5 to 4.5 wt % and most preferably 0.5 to 3.5 wt %.

The isocyanate-terminated compound B may be a polyisocyanate as described above (for convenience called polyisocyanate B). The isocyanate-terminated compound B may also be an isocyanate-terminated prepolymer. If the isocyanate-terminated compound B is an isocyanate-terminated prepolymer (for convenience described as isocyanate-terminated prepolymer B) it is preferably obtained by reacting components as described above for isocyanate-terminated prepolymer A.

The isocyanate-terminated compound B may comprise one or more than one isocyanate-terminated prepolymer B and/or polyisocyanate B. If isocyanate-terminated compound B is an isocyanate-terminated prepolymer B, it may also be partially chain-terminated and or chain-extended before being introduced in step 3.

Step 2a) and step 2b) of the process of the invention may be in any order. Step 4a) and step 4b) of the process of the invention may be in any order. Furthermore step 2a) and 2b), step 3), step 4a) and step 4b) may be repeated.

Preferably step 2a) comprises reacting the isocyanate groups of isocyanate-terminated prepolymer A with 0 to 0.8, more preferably 0.1 to 0.7 and most preferably 0.1 to 0.6 stoichiometric equivalents of at least one active-hydrogen containing chain-terminating compound.

Preferably step 2b comprises reacting the isocyanate groups of isocyanate-terminated prepolymer A with 0 to 0.95, more preferably 0 to 0.9 and most preferably 0 to 0.8 stoichiometric equivalents of at least one active-hydrogen containing chain-extending compound.

Preferably steps 2a) and 2b) together are in the range of from 0.1 to 0.95, more preferably 0.2 to 0.9, most preferably 0.2 to 0.85 and especially 0.3 to 0.85 stoichiometric equivalents.

Preferably step 3) comprises introducing 0 to 1600%, more preferably 0 to 1000%, even more preferably 0 to 500%, especially 0 to 150% and most especially 0 to 100% by weight of isocyanate-terminated prepolymer A of an isocyanate-terminated compound B.

Preferably step 4a) comprises reacting the isocyanate groups of the isocyanate-terminated prepolymer obtained in steps 2a) and 2b) and isocyanate-terminated compound B introduced in step 3) with 0 to 0.55, more preferably 0 to 0.45 and most preferably 0 to 0.42 stoichiometric equivalents of at least one active-hydrogen containing chain-terminating compound.

Preferably step 4b) comprises reacting the isocyanate groups of the isocyanate-terminated prepolymer obtained in steps 2a) and 2b) and the isocyanate-terminated compound B introduced in step 3) with 0 to 1.1, more preferably 0 to 0.95 and most preferably 0 to 0.85 stoichiometric equivalents of at least one active-hydrogen containing chain-extending compound.

Preferably steps 4a) and 4b) together are in the range of from 0.3 to 1.2, more preferably 0.3 to 1.1 and most preferably 0.4 to 1.1 stoichiometric equivalents.

Preferably if 0 wt % of the isocyanate-terminated compound B is introduced then step 2a) comprises 0.1 to 0.55, more preferably 0.1 to 0.45 and most preferably 0.1 to 0.42 stoichiometric equivalents of at least one active-hydrogen containing chain-terminating compound.

As is clear to those skilled in the art more than 1 stoichiometric equivalents of a chain-terminating compound or more than 1 stoichiometric equivalents of a chain-extending compound or more than 1 stoichiometric equivalents of a chain-terminating and a chain-extending compound together, based on the amount of free-isocyanate groups available would not react with any isocyanate groups and would be present as an excess. Where 1 or more than 1 stoichiometric equivalents is used in the present invention this also includes having an excess of chain-terminating and chain-extending compounds present. For example if ethanol is used as a solvent, it can under the right reaction conditions such as elevated temperatures or prolonged reaction times act as a chain-terminating compound and yet it is present in an excess. Furthermore when an excess of chain-terminating and or chain-extending compounds are present these may advantageously react with any introduced isocyanate-terminated compound B.

Preferably, if necessary, the final steps in each process embodiment are repeated until the isocyanate group content is $\leq 1$ wt %, more preferably $\leq 0.5$ wt %, most preferably 0.01 wt % and especially is so low that the isocyanate group content is no longer detectable using methods well known in the art. Examples of suitable processes include but are not limited to the following processes:

Preparation of isocyanate-terminated prepolymer A (1), partial chain-termination (2a) and partial or full chain-extension (4b).

Preparation of isocyanate-terminated prepolymer A (1), partial chain-extension (2b), partial chain-termination (4a) and chain-extension (4b).

Preparation of isocyanate-terminated prepolymer A (1), partial chain-termination (2a), introducing isocyanate-terminated compound B (3), partial or full chain-extension (4b) and optionally partial or full chain-termination (4a).

Preparation of isocyanate-terminated prepolymer A (1), partial chain-extension (2b), introducing isocyanate-terminated compound B (3), partial or full chain-termination (4a) and partial or full chain-extension (4b).

Preparation of isocyanate-terminated prepolymer A (1), partial chain-termination (2a), partial chain-extension (2b), introducing isocyanate-terminated compound B (3) and partial or full chain-extension (4b) and/or partial or full chain-termination (4a).

After obtaining the solvent borne polyurethane composition some or all of the organic solvent may be removed or further organic solvent and or water may be added to give a polyurethane solution with a solids content in the range of from 10 to 90 wt %, preferably 35 to 75 wt %, more preferably 42 to 65 wt % and most preferably 49 to 60 wt %.

The solvent borne polyurethane composition has a balance between properties such as good solubility in solvents, good adhesion, bond strength, block resistance, heat resistance and printability.

The composition of the invention may be used directly or in combination with, for example, fillers, waxes, thickeners, co-resins and/or colorants.

The composition of the invention may be used as a binder for packaging inks.

In an embodiment of the present invention there is provided an ink comprising a solvent borne polyurethane composition according to the invention, a colorant and optionally additional organic solvent.

The ink preferably has a viscosity in the range of from 30 to 1,000 mPa·s, more preferably 30 to 500 mPa·s at 20° C.

The ink viscosity may also be measured using a cup type viscometer where the time it takes a sample to flow out of the orifice of the sample container is measured in seconds. An example of such a viscometer is a Ford Cup viscometer and a Ford Cup 4 viscometer has an orifice of 4 mm. This cup is suitable for ink viscosities in the range of from approximately 30 to 375 mPa·s and such inks usually flow out in about 10 to 100 seconds.

The ink preferably has a viscosity in the range of from 10 to 100 seconds, more preferably 10 to 75 seconds and especially 10 to 60 seconds when measured using a Ford Cup 4.

Preferably the ink has a solids content in the range of from 10 to 80 wt %, more preferably 10 to 70 wt % and most preferably 15 to 60 wt %.

Preferably the ink comprises 9 to 79 wt %, more preferably 9 to 70 wt % and most preferably 9 to 60 wt % of the solvent borne polyurethane obtained from the process of the present invention.

Preferably the ink comprises 1 to 50 wt %, more preferably 3 to 40 wt % and most preferably 8 to 40 wt % of a colorant.

Colorants include dyes, pigments or mixtures thereof. The pigment may be any conventional organic or inorganic pigment such as titanium dioxide, carbon black or any coloured pigments well known in the art.

The dyes may be any conventional dyes selected from acid dyes, natural dyes, cationic or anionic direct dyes, basic dyes and reactive dyes.

Optionally the ink may also contain other ingredients typically used in inks, for example de-foamers, anti-oxidants, corrosion inhibitors, bactericides and viscosity modifiers.

The ink may be used in a number of printing processes including flexographic and/or gravure printing processes.

In a further embodiment of the present invention there is provided a process for printing an image on a substrate comprising applying thereto an ink comprising a polyurethane composition according to the present invention.

Preferably the printing process is a flexographic and/or gravure printing process.

The invention will now be described by example only. CE denotes a comparative example. All parts and percentages are by weight unless specified otherwise.

Materials Used:

NeoRez U-391 is a non reactive polyurethane, 70 wt % solids and 30 wt % solvent (98% ethyl acetate, 2% ethanol) available from DSM NeoResins BV. The Mw is 6000 g/mol. NeoRez U-391 is non-film forming (on removal of all/most of the liquid medium from the polyurethane composition a paste remains).

NeoRez U-371 is a non tacky, elastomeric, non reactive polyurethane, 42 wt % solids and 68 wt % solvent (23% ethyl acetate, 77% ethanol) available from DSM NeoResins BV. The Mw is 40,500 g/mol. NeoRez U-371 is film forming (on removal of all/most of the liquid medium from the polyurethane composition a cohesive film is formed which can be taken out of a mould without tearing the film and on stretching the film it recovers its shape.)

| | |
|---|---|
| EtOH = | ethanol (99.8%) (solvent and terminator) (BP) |
| EA = | ethylacetate (solvent) (BP) |
| Solsperse 20000 = | dispersing agent (Noveon) |
| Solsperse 12000 = | dispersing agent (Noveon) |
| Finntitan RD15 = | white pigment (Kemira) |
| Sunfast Blue 249-0435 = | blue pigment (Sun Chemical) |
| NC A-400 (65% IPA) = | nitrocellulose binder (Wolff) |
| COPP = | substrate, MB 400, co-extruded bioriented polypropylene (Mobil) |

| | |
|---|---|
| PET (Corona) = | substrate, Mylar 400C, polyester, corona treated, (Toray Plastic) |
| PET (PVDC) = | substrate, 14F760, polyester, PVDC treated (Deprosa) |
| PET (Chemical) = | substrate, Mylar 813, polyester, chemical treated (Toray Plastic) |
| PE = | substrate, polyethylene |
| s.a. = | stoichiometric equivalents of unreacted NCO |

Molecular Weight Measurements:

Gel Permeation Chromatography analysis for the determination of polymer molecular weights were performed on a Waters HPLC equipment, including a pump (Waters 515 HPLC pump), an autoinjector (Waters 717 plus), and a column oven. The eluent was a BHT stabilized tetrahydrofuran GPC grade, purity ≧99.8% (THF). The injection volume was 150 μl. The flow rate was established at 1.0 cm$^3$/min. Three new PLgel 5 μm MIXED-D (300×7.5 mm) from Polymer laboratories with a guard column (PLgel 5 μm Guard, 50×7.5 mm) were applied at a temperature of 40° C. The detection was performed with a differential refractive index detector (Waters 2410) at 40° C. internal temperature. 25 mg of sample were dissolved in 4 cm$^3$ of THF, and the mixtures were left undisturbed for at least 1 hour. Calibration was performed with 8 polystyrene standards (Polymer Laboratories, Easical PS-2), ranging from 580 to 377,400 g/mol prepared at a concentration of 0.10% w/v. The calculation was performed with Empower PRO 2002 software (Waters) with a third order calibration curve (R>0.99990) and using a flat and horizontal baseline considering species between 400,000 and 500 g/mol.

The molecular weights are expressed in g/mol in this application and it should be understood that this is a molecular weight measured against polystyrene standards and derived using universal calibration as described above.

EXAMPLES 1 TO 6 AND 8 (BLENDS) AND COMPARATIVE EXAMPLES 7, 9 AND 10

The examples and comparative examples were prepared by blending the components and where necessary adjusting the liquid medium to obtain compositions with a similar solids content and a harmonised solvent system of about 30% ethyl acetate and 70% ethanol. This shows that it is possible to get a low viscosity system which indicates a better solvent compatibility, better resolubility and is more suitable for printing. See Table 1 below for the compositions:

TABLE 1

| Example | 1 | 2 | 3 | 4 | 5 |
|---|---|---|---|---|---|
| Components | | | | | |
| U-391 (g) | 22.4 | 25 | 10 | 41 | 15 |
| U-371 (g) | 77.6 | 75 | 90 | 59 | 85 |
| Results | | | | | |
| Solids (wt %) | 46.7 | 47.1 | 44.6 | 50.4 | 45.8 |
| Viscosity at 25° C. (mPa · s) | 2110 | 2300 | 2090 | 2200 | 2100 |
| Mw | 40850 | 38650 | 48880 | 3020 | 42910 |
| Mp | 44660 | 44390 | 40700 | 6930 | 40390 |
| PDi | 4.5 | 4.6 | 3.7 | 4.8 | 3.8 |
| Adjusted to about 38% solids | | | | | |
| Ethanol (g) | 56.6 | 60.1 | 35.0 | 83.3 | 42.1 |
| Ethyl acetate (g) | 0 | 0 | 6.0 | 0 | 5.0 |

TABLE 1-continued

| | | | | | |
|---|---|---|---|---|---|
| Results | | | | | |
| Solids | 38.2 | 37.8 | 38.2 | 38.1 | 37.8 |
| Viscosity at 25° C. (mPa · s) | 350 | 300 | 460 | 179 | 355 |

| Example | 6 | CE 7 | 8 | CE 9 | CE 10 |
|---|---|---|---|---|---|
| U-391 (g) | 30 | 5 | 50 | 0 | 100 |
| U-371 (g) | 70 | 95 | 50 | 100 | 0 |
| Results | | | | | |
| Solids | 48.5 | 43.8 | 52.7 | 43.2 | 70.4 |
| Viscosity at 25° C. (mPa · s) | 2130 | 1770 | 2740 | 1690 | 1100 |
| Mw | 33610 | 45870 | 25070 | 50310 | 6000 |
| Mp | 39160 | 40860 | 6920 | 40460 | 4170 |
| PDi | 4.4 | 2.6 | 4.4 | 2.3 | 1.6 |
| Adjusted to about 38% solids | | | | | |
| Ethanol (g) | 67.0 | 28.9 | 89.2 | 20.0 | 210.5 |
| Ethyl acetate (g) | 0 | 10.2 | 0 | 9.6 | 0 |
| Results | | | | | |
| Solids | 37.9 | 38.1 | 38.1 | 38.2 | 37.8 |
| Viscosity at 25° C. (mPa · s) | 225 | 530 | 130 | 640 | 24 |

EXAMPLE 11

In Situ

Step 1

A 2 liter four-necked reactor with an agitator, a thermometer, a condenser and a gas introduction pipe was charged with melted 4,4' diphenylmethane diisocyanate (85.1 g), polypropylene glycol (440.5 g, Mw 4000) and 1,3-butyleneglycol (9.2 g). The mixture was heated to 45° C. under nitrogen. Tin catalyst (0.07 g) was added to the reaction vessel. The temperature was increased to 65° C. and held for 30 minutes. The resultant NCO % was 1.8%. Ethyl acetate (119.1 g) was added to the vessel while cooling to a temperature between 50 and 25° C. The NCO of the resultant isocyanate-terminated prepolymer A was 1.4%.

Step 2a n-Butylamine (6.8 g, 0.4 s.a.) in ethyl acetate (79.7 g) was added to the isocyanate-terminated prepolymer A (735.2 g) prepared in step 1. The resultant NCO % was 0.7%.

Step 3

An additional amount of isocyanate-terminated prepolymer A was prepared in the same way as described in step 1 (488.7 g, 66%) and added to the reaction mixture obtained in step 2a.

Step 4a and 4b

Isophorone diamine (19.5 g, 0.80 s.a.) and n-butylamine (3.1 g, 0.15 s.a.) in ethanol (580 g) were added to the reaction vessel. The reaction was continued until the final NCO % was below the limit of detection (0.1%). Subsequently ethanol was added to adjust the solids content of the resultant polyurethane composition to 50 wt %.

The resultant polyurethane composition had a Mw of 59,850 g/mol, a Mp of 58,150 g/mol and a PDi of 3.9. The viscosity of the resultant product was 3450 mPa·s when measured with a Brookfield LVT viscometer at 60 rpm, spindle 4 and at 25° C.

A sample of a totally chain terminated (1.0 s.a. of n-butylamine) isocyanate-terminated prepolymer A was prepared and had a Mw of 20,460 g/mol. A chain extended (0.80 s.a. of isophorone diamine) isocyanate-terminated prepolymer A was prepared and had a Mw of 75,000 g/mol. A blend was prepared by blending the totally chain terminated prepolymer A (polyurethane A) and the chain extended prepolymer A (polyurethane B) in a proportion 10/90 wt %, which is the theoretical wt % corresponding to the degree of chain-terminating conducted in step 2a above. The solids (50%) and the solvent system of the resultant blend (ethanol/ethyl acetate, 64/36) were the same as in the current example. The resultant blend had a Mw of 56,600 g/mol, a Mp of 55000 g/mol, a PDi of 4.0 and a viscosity of 3550 mPa·s when measured with a Brookfield LVT viscometer at 60 rpm, spindle 4 and at 25° C. It was concluded that the polyurethane composition of the current example is made of approximately 10 wt % of a polyurethane A with a Mw of 20460 g/mol and a 90 wt % of a polyurethane B with a Mw of 75,000 g/mol.

Tack Test

A film was prepared by pouring enough of the example compositions, so as to have 7.5 grams of polyurethane, into a plastic container (8 cm diameter, 1 cm deep). The plastic container with the composition was left in an oven at 45 to 50° C. for one day and then allowed to cool to room temperature. Then the resultant film was taken out from the container. A slight pressure was applied with fingers on the film for a few seconds. On removal of the fingers from the film the tack of the film was compared. Results are shown in Table 2 below and are expressed as follows 0=no tack +/−=very slight tack +low tack ++=tacky +++=very tacky

TABLE 2

| Example | 1 | 2 | 3 | 4 | 5 |
|---|---|---|---|---|---|
| Tack | ++ | ++ | 0 | +++ | + |
| Film forming | Yes | Yes | Yes | Yes | Yes |
| Example | 6 | CE 7 | 8 | CE 9 | CE 10 |
| Tack | ++ | 0 | ++++ | 0 | 0 |
| Film forming | Yes | Yes | Yes | Yes | NO |

White Ink

Ingredients 1 to 4 as shown in Table 3 below were mixed into a homogeneous mixture. Ingredient 5 was added to the mixture and dispersed using a Cowles Dissolver or the like until a slurry consistency was reached and the pigment particles were smaller than 10 μm (about 30 minutes). Ingredient 6 was added under agitation. The viscosity of the ink was adjusted with ingredient 7 to a viscosity of 18 to 22 seconds as measured by a Ford Cup 4 at 20° C.

TABLE 3

| No | Ingredient | Ink 1 | Ink 2 | Ink 3 | Ink 4 | Ink 5 |
|---|---|---|---|---|---|---|
| 1 | Ethanol | 6.8 | 8.7 | 7.8 | 9.0 | 10.5 |
| 2 | Ethyl Acetate | 4.2 | 4.2 | 4.2 | 4.2 | 4.2 |
| 3 | Solsperse 20000 | 0.5 | 0.5 | 0.5 | 0.5 | 0.5 |
| 4 | NeoRez U-371 | 17.8 | — | — | — | — |
| 4 | Example 1 | — | 15.9 | — | — | — |
| 4 | Example 3 | — | — | 16.8 | — | — |
| 4 | Example 6 | — | — | — | 15.6 | — |
| 4 | Example 8 | — | — | — | — | 14.1 |
| 5 | Finntitan RD15 | 36.5 | 36.5 | 36.5 | 36.5 | 36.5 |
| 6 | NeoRez U-371 | 12.2 | — | — | — | — |
| 6 | Example 1 | — | 10.9 | — | — | — |
| 6 | Example 3 | — | — | 11.5 | — | — |
| 6 | Example 6 | — | — | — | 10.7 | — |
| 6 | Example 8 | — | — | — | — | 9.7 |
| 7 | Ethanol | 22 | 23.3 | 22.7 | 28.5 | 24.5 |

Adhesion

A film of the white ink prepared as described in Table 3 above was cast onto each substrate (6 μm wet) and dried with a hairdryer for 5 seconds.

A self adhesive tape (10 cm, type 683 of 3M) was applied under uniform pressure onto the ink layer on each substrate immediately after drying of the layer and torn off the substrate immediately thereafter. The quantity of the print adhered to the tape was classified with a scale from 0 to 5, where 0 means more than 95% of the printed layer adhered to the tape, 1 means more than 50% of the layer adhered to the tape, 2 means less than 30%, of the printed layer adhered to the tape, 3 means less than 20% of the printed layer adhered to the tape, 4 means less than 10% of the printed layer adhered to the tape and 5 means less than 2% of the printed film adhered to the tape. The results are shown in Table 4 below.

TABLE 4

| | Ink 1 | Ink 2 | Ink 3 | Ink 4 | Ink 5 |
|---|---|---|---|---|---|
| COPP | 5 | 5 | 5 | 5 | 5 |
| PET (PVdC) | 5 | 5 | 5 | 5 | 5 |
| PET (Corona) | 5 | 5 | 5 | 5 | 5 |
| PET (Chemical) | 5 | 5 | 5 | 5 | 5 |

Bondstrengths

The technique for the production of the laminate is the adhesive based lamination technique. A film of the white ink prepared as described in Table 3 above was cast onto each substrate (6 μm wet) and dried with a hairdryer for 5 seconds. After 2 hours an adhesive Novacote 275/Ca 12, 4 μm wet, 33.3% solids was applied onto the white ink layer and the second substrate was applied to the adhesive layer. The laminates were rolled with a 10 kg roller and stored for 2 days at room temperature. Then the bond strength was measured by pulling the substrates apart using dynamo meter JBA model 853.

The bond strength is expressed as a combination of number value and letters. The number value stands for grams needed to separate the laminate of a width of 15 mm and a dynamometer speed of 100 mm/min and is given in Newton/15 mm. The higher the value the greater the bond strength. The letters indicate the kind of breakage with regards to the layer of the printing ink. The results are given in Table 5 below.

TABLE 5

| Lamination | Ink 1 | Ink 2 | Ink 3 | Ink 4 | Ink 5 |
|---|---|---|---|---|---|
| COPP/COPP | 4.8R | 4.7R | 5.1R | 3.0R | 2.8R |
| COPP/PE | 5.4R | 6.5R | 4.6R | 3.2P | 3.6R |
| PET (chemical)/COPP | 2.7R | 3.0R | 2.5R | 3.8R | 2.8R |
| PET (Chemical)/PE | 5.1R | 3.5R | 5.0R | 2.9P | 1.5P |
| PET (PVDC)/COPP | 4.0R | 4.4R | 4.0R | 3.3R | 3.5R |
| PET (PVDC)/PE | 4.3R | 4.4R | 3.7R | 3.4R | 3.0R |

TABLE 5-continued

| Lamination | Ink 1 | Ink 2 | Ink 3 | Ink 4 | Ink 5 |
|---|---|---|---|---|---|
| PET (Corona)/COPP | 3.7R | 1.6P | 1.4P | 3.5P | 1.8P |
| PET (Corona)/PE | 3.7R | 1.3P | 1.3P | 2.0P | 1.9T |

T: Transfer of 100% of the ink layer (from the substrate to the counter substrate)
P: Splitting of the ink layer (between the substrate and the counter substrate)
R: Break/Tear of one of the two films of the laminate.

Block Resistance

A OPP film printed with a white ink layer (6 μm wet, prepared as described in Table 2 above) and dried with a hairdryer for 5 seconds was overlapped onto an unprinted OPP film which had been subjected to a corona-discharging treatment so that the printed and therefore inked surface of the former was brought into contact with the surface of the latter.

The resulting assembly was allowed to stand under a load of 3 kg/cm$^2$ at 40° C. for one day. The unprinted OPP film was peeled off from the printed OPP film and the degree to which the ink film was transferred to the unprinted surface was observed and given a scale of 1 to 4 and the results are shown in table 6 below:
4 means the unprinted OPP film was smoothly peeled off and none of the ink film was transferred thereto (good).
3 means the unprinted OPP film was not smoothly peeled off but none of the ink film was transferred thereto (acceptable).
2 means that less than 50% of the ink film was transferred.
1 means that 50 to 100% of the ink film was transferred.

The results show that as the wt % of elastomeric polyurethane is decreased the block resistance is reduced.

TABLE 6

|  | Ink 1 | Ink 2 | Ink 3 | Ink 4 | Ink 5 |
|---|---|---|---|---|---|
| Ink/film | 4 | 3.5 | 3 | 2 | 1.5 |

Heat Resistance

Heat resistance (also known as the thermo resistance) was tested with a heat-sealing machine, Otto Brugger HSG/ETK. An area of a printed substrate in contact with aluminium foil was placed between the heat seal jaws previously preset to a temperature of at least 120° C. A dwell time of 1 second at a pressure of 3 bars/cm$^2$ was applied. After cooling the print and the foil were pulled apart and examined for ink pick off and ink transfer on to the foil. If the sample passed the test, the temperature was increased step by step until failure occurred. For a pass there should be no ink transfer from the print to the foil. An acceptable temperature for a fail is 140° C. The results are shown below in Table 7.

TABLE 7

|  | Ink 1 | Ink 2 | Ink 3 | Ink 4 | Ink 5 |
|---|---|---|---|---|---|
| COPP | 200° C. | 180° C. | 180° C. | 180° C. | 140° C. |

Cob-Webbing

Cob-webbing is one of the causes of printing problems. The polyurethane compostions of the examples 1, 3, 6 and 8 and comparative example 9 were formulated into a blue ink to show improvement in the cob-webbing tendency.

Ingredients 1 to 5 as shown in Table 8 below were mixed into a homogeneous mixture.

Ingredient 6 was added to the mixture and dispersed using a Cowles Dissolver or the like until a slurry consistency was reached and the pigment particles were reduced to a size less than to 10 (about 30 minutes). Ingredients 7, 8 and 9 were added under agitation. The viscosity of the ink was adjusted with ingredient 10 to a viscosity of 30 to 40 seconds as measured by a Ford Cup 4 at 20° C. The inks were then adjusted with further ethanol to a viscosity of 18 to 22 seconds as measured by a Ford Cup 4 at 20° C.

TABLE 8

| No | Ingredient | Ink 8 | Ink 9 | Ink 10 | Ink 11 | Ink 12 |
|---|---|---|---|---|---|---|
| 1 | Ethanol | 25.9 | 25.9 | 25.9 | 25.9 | 25.9 |
| 2 | Ethyl Acetate | 8.1 | 8.1 | 8.1 | 8.1 | 8.1 |
| 3 | Solsperse 20000 | 1.6 | 1.6 | 1.6 | 1.6 | 1.6 |
| 4 | Solsperse 12000 | 0.6 | 0.6 | 0.6 | 0.6 | 0.6 |
| 5 | NC A-400 (65% IPA) | 3.9 | 3.9 | 3.9 | 3.9 | 3.9 |
| 6 | Sunfast Blue 249-0435 | 12.0 | 12.0 | 12.0 | 12.0 | 12.0 |
| 7 | Ethanol | 13.8 | 12.4 | 14.3 | 16.4 | 13.1 |
| 8 | Ethyl Acetate | 5.9 | 5.9 | 5.9 | 5.9 | 5.9 |
| 9 | Comparative example 9 | — | — | — | — | 24.2 |
| 9 | Example 3 | 23.5 | — | — | — | — |
| 9 | Example 1 | — | 24.9 | — | — | — |
| 9 | Example 6 | — | — | 23.0 | — | — |
| 9 | Example 8 | — | — | — | 20.9 | — |
| 10 | Ethanol | 4.7 | 4.7 | 4.7 | 4.7 | 4.7 |

Five drops of the blue ink composition were put onto clean polyethylene film. The drops were cast immediately with a flexographic hand roller which was rolled 5 times (up & down), under a spot suction. The cob webbing tendency was observed during the application.

After five minutes, the appearance of the ink applied onto the polyethylene film was judged with respect the amount of ink which is removed from the substrate, indicating different evolution of tack among the versions. The scale used was 0 to 5 with 5 being the best result. The results are shown in Table 9 below.

It is apparent that the low viscosity of examples 1, 6 and 8 (inks 9, 10 and 11) when compared to example 3 and comparative example 9 (ink 8 and 12) at equivalent solids (38%, Table 1) contribute to an improvement in cob-webbing and inter alia printing properties.

TABLE 9

|  | Ink 12 | Ink 8 | Ink 9 | Ink 10 | Ink 11 |
|---|---|---|---|---|---|
| Cob-webbing | 0 | 1 | 2 | 2 | 3 |
| Appearance | 0 | 1 | 2 | 3 | 5 |

The invention claimed is:
1. A solvent borne polyurethane composition comprising:
I) 10 to 90 wt % of at least a non-film-forming polyurethane A with a weight average molecular weight (Mw) in the range of from 5,000 to 23,000 g/mol;
II) 90 to 10 wt % of at least a film-forming polyurethane B with a weight average molecular weight (Mw) in the range of from 25,000 to 100,000 g/mol; where i)+ii) add up to 100%; and
III) a liquid medium, wherein
the polyurethanes selected from the group consisting of polyurethane A, polyurethane B and both polyurethanes A and B, in the composition have a polymodal molecular weight distribution.
2. A solvent borne polyurethane composition according to claim 1 having a viscosity of less than or equal to 10,000 mPa-s at any solids content in the range of from 20 to 75 wt % in a solvent comprising greater than or equal to 70 wt % of at least one solvent having an evaporation rate (ER) greater than or equal to 1 times the ER of butyl acetate defined as 1.00 in dimensionless units, ER being measured according to ASTM D3539.

3. A solvent borne polyurethane composition according to claim 1, wherein 15 to 85 wt % of each of the polyurethanes A and B in the composition have a Mw at least 10,000 g/mol greater than the Mw of a remaining 85 to 15 wt % of each of the respective polyurethanes A and B in the composition.

4. A solvent borne polyurethane composition according to claim 1 with the proviso that 35 to 70 wt % of each of the polyurethanes A and B in the composition have a Mw of at least 5,000 g/mol greater than a remaining Mw of 20 to 50 wt % of each of the respective polyurethanes A and B in the composition.

5. A solvent borne polyurethane composition according to claim 1, wherein the Mp of each of the polyurethanes A and B in the composition is in the range of from 6,000 to 60,000 g/mol.

6. A solvent borne polyurethane composition according to claim 1, wherein the PDi of each of the polyurethanes A and B in the composition is in the range of from 1.3 to 10.

7. A solvent borne polyurethane composition according to claim 1, where for each of the polyurethanes A and B in the composition the Mp is in the range of from 6,000 to 60,000 g/mol and the PDi is in the range of from 2.8 to 6.

8. A solvent borne polyurethane composition according to claim 1, where polyurethane A is obtained by reacting components comprising:
(i) 8 to 45 wt % of at least one polyisocyanate;
(ii) 0 to 5 wt % of at least one isocyanate-reactive polyol with a weight-average molecular weight in the range of from 50 to 200 g/mol;
(iii) 40 to 92 wt % of at least one isocyanate-reactive polyol with a weight-average molecular weight in the range of from 201 to 20,000 g/mol;
(iv) 0 to 9 wt % of a chain-extending and/or chain-terminating component not comprised by (i), (ii), or (iii); and
(v) 0 to 3 wt % of an isocyanate-reactive polyol not comprising (ii), (iii) or (iv);
where (i), (ii), (iii), (iv) and (v) add up to 100%; and optionally in the presence of a liquid medium.

9. A solvent borne polyurethane composition according to claim 1, where polyurethane B is obtained by reacting components comprising:
(i) 10 to 20 wt % of at least one polyisocyanate;
(ii) 0 to 3 wt % of at least one isocyanate-reactive polyol with a weight-average molecular weight in the range of from 84 to 200 g/mol;
(iii) 70 to 89 wt % of at least one isocyanate-reactive polyol with a weight-average molecular weight in the range of from 350 to 5,000 g/mol;
(iv) 3 to 8 wt % of a chain-extending and/or chain-terminating component not comprised by (i), (ii), or (iii);
(v) 0 to 3 wt % of an isocyanate-reactive polyol not comprised by (ii), (iii) or (iv);
where (i), (ii), (iii), (iv) and (v) add up to 100%; and optionally in the presence of a liquid medium.

10. A process for obtaining a solvent borne polyurethane composition according to claim 1, comprising the step of blending polyurethane A and polyurethane B.

11. A process for obtaining a solvent borne polyurethane composition according to claim 9, comprising the following steps:
1) preparing an isocyanate-terminated prepolymer;
2a) reacting the isocyanate groups of isocyanate-terminated prepolymer with 0.1 to 0.6 stoichiometric equivalents of at least one active-hydrogen containing chain-terminating compound;

2b) reacting the isocyanate groups of the isocyanate-terminated prepolymer obtained in step 2a) with 0.1 to 1.2 stoichiometric equivalents of at least one active-hydrogen containing chain-extending compound;
2c) optionally reacting the isocyanate groups obtained from step 2b) with 0 to 1.0 stoichiometric equivalents of at least one active-hydrogen chain-terminating compound.

12. A process for obtaining a solvent borne polyurethane composition according to claim 9, comprising the following steps:
1) preparing an isocyanate-terminated prepolymer A;
2a) reacting the isocyanate groups of isocyanate-terminated prepolymer A with 0 to 0.95 stoichiometric equivalents of at least one active-hydrogen containing chain-terminating compound;
2b) reacting the isocyanate groups of isocyanate-terminated prepolymer A with 0 to 0.95 stoichiometric equivalents of at least one active-hydrogen containing chain-extending compound; where steps 2a) and 2b) together are in the range of from 0.1 to 1.8 stoichiometric equivalents;
3) optionally introducing an isocyanate-terminated compound B;
4a) reacting the isocyanate groups of the isocyanate-terminated prepolymer obtained in steps 2a) and 2b) and isocyanate groups of the isocyanate-terminated compound B introduced in step 3) with 0 to 1.0 stoichiometric equivalents of at least one active-hydrogen containing chain-terminating compound;
4b) reacting the isocyanate groups of the isocyanate-terminated prepolymer obtained in steps 2a) and 2b) and the isocyanate groups of the isocyanate-terminated compound B introduced in step 3) with 0 to 1.2 stoichiometric equivalents of at least one active-hydrogen containing chain-extending compound;
where steps 4a) and 4b) together are in the range of from 0 to 1.2 stoichiometric equivalents;
where the process comprises at least one step with an active-hydrogen containing chain-extending compound and at least one step with an active-hydrogen containing chain-terminating compound;
where if 0 wt % of the isocyanate-terminated compound B is introduced then step 2a) comprises 0.1 to 0.95 stoichiometric equivalents of at least one active-hydrogen containing chain-terminating compound and at least a step 2a) is performed before a step 2b).

13. An ink comprising a solvent borne polyurethane composition according to claim 1, a colorant, and optionally an additional organic solvent.

14. An ink according to claim 13 having a viscosity in the range of from 10 to 100 seconds when measured using a Ford Cup 4 at 20° C.

15. A process for printing an image on a substrate comprising applying an ink according to claim 13.

16. A process according to claim 15, wherein the image is printed on the substrate by a flexographic printing process.

17. A process according to claim 15, wherein the image is printed on the substrate by a gravure printing processes.

18. A laminate comprising a substrate printed with a solvent borne polyurethane composition according to claim 1.

* * * * *